(12) United States Patent
Crow et al.

(10) Patent No.: US 7,843,468 B2
(45) Date of Patent: Nov. 30, 2010

(54) ACCELLERATED START TILE SEARCH

(75) Inventors: Franklin C. Crow, Portola Valley, CA (US); Jeffrey R. Sewall, Pleasanton, CA (US)

(73) Assignee: Nvidia Corporation, Santa Clara, CA (US)

( * ) Notice: Subject to any disclaimer, the term of this patent is extended or adjusted under 35 U.S.C. 154(b) by 365 days.

(21) Appl. No.: 11/494,407

(22) Filed: Jul. 26, 2006

(65) Prior Publication Data

US 2008/0024522 A1 Jan. 31, 2008

(51) Int. Cl.
*G09G 5/00* (2006.01)
(52) U.S. Cl. ...................... 345/628; 345/623
(58) Field of Classification Search .......... 345/621, 345/620
See application file for complete search history.

(56) References Cited

U.S. PATENT DOCUMENTS

| | | | |
|---|---|---|---|
| 4,208,810 A * | 6/1980 | Rohner et al. ............ 434/43 |
| 4,918,626 A * | 4/1990 | Watkins et al. ............ 345/421 |
| 5,543,935 A * | 8/1996 | Harrington ............... 358/3.07 |
| 6,323,874 B1 * | 11/2001 | Gossett .................. 345/619 |
| 6,938,176 B1 | 8/2005 | Alben et al. |
| 6,956,579 B1 | 10/2005 | Diard et al. |
| 7,075,542 B1 | 7/2006 | Leather |
| 7,483,029 B2 | 1/2009 | Crow et al. |
| 2004/0085313 A1 | 5/2004 | Moretom |
| 2006/0267981 A1 | 11/2006 | Naoi |

FOREIGN PATENT DOCUMENTS

CN 101093578 12/2007

* cited by examiner

*Primary Examiner*—Kee M Tung
*Assistant Examiner*—Carlos Perromat (57) ABSTRACT

In a raster stage of a graphics pipeline, a method for accelerated start tile rasterization. The method includes defining a window for clipping a generated image and receiving a graphics primitive for rasterization in a raster stage of a graphics processor. A binary search related to the window is performed to determine a start tile having at least a partial coverage of the graphics primitive, wherein the start tile comprises a plurality of pixels. Based upon the start tile, the raster stage rasterizes the graphics primitive by generating a plurality of adjacent tiles having at least a partial coverage of the graphics primitive.

20 Claims, 7 Drawing Sheets

FIGURE 7 ial images begin at one edge of the clipping window and
ACCELERATED START TILE SEARCH

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a vertex, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Various traversal algorithms have been developed for moving from pixel to pixel in a way such that all pixels within a primitive are covered. The traversal algorithms need to take into account a clipping window in which the primitives comprising an image are to be rendered.

Generally, a clipping window comprises a data structure (e.g., rectangle data structure, window clip plane, etc.) that is used to represent the visible areas of an image. GPUs include special hardware and/or software for holding the clipping information in order to properly clip graphics primitives. The viewing, perspective, and clipping stages require a large number of arithmetic operations for the vertices and edges of each polygon received.

A problem exists, however, in rasterizing primitives that only partially reside within a clipping window. Typical prior art solutions involve rasterizing primitives and generating the resulting covered pixels in a unidirectional manner. Such traditional unidirectional solutions involve generating the pixels row-by-row in a constant direction. The traditional solutions begin at one edge of the clipping window and traverse across the clipping window until the primitive is encountered, and then step across the primitive until a line of rasterization complete. This requires that the sequence shift across the image to find the edge of the primitive. When the edge of the primitive is outside the clipping window, the traditional solutions are required to step from the starting edge and traverse across the primitive until they step into the visible region of the primitive (e.g., the portion within the clipping window).

Thus a large amount of work and a corresponding large number of clock cycles are consumed rasterizing pixels that ultimately will not be rendered within the image. This results in a very large negative performance impact on the overall 3-D rendering process. The negative performance impact is even more pronounced for those primitives having a majority of their area outside the clipping window (e.g., long thin triangles that are often encountered in shadowing applications).

Accordingly, a need exists for a rasterization process that can ensure needed graphics rendering hardware, and clock cycles consumed by that rendering hardware, are productively utilized generating pixels that are relevant to the image being created.

SUMMARY OF THE INVENTION

Embodiments of the present invention provide a method and system for a rasterization process that ensures needed graphics rendering hardware and clock cycles consumed by the rendering hardware are productively utilized generating pixels that are relevant to a window clipped image being created.

In one embodiment, the present invention is implemented as a method for accelerated start tile rasterization in a raster stage of a graphics pipeline (e.g., GPU). The method includes defining a window for clipping a generated image and receiving a graphics primitive for rasterization in the raster stage of the graphics processor. A binary search related to the window is performed to determine a start tile having at least a partial coverage of the graphics primitive. Based upon the start tile, the raster stage rasterizes the graphics primitive by generating a plurality of nearby tiles having at least a partial coverage of the graphics primitive. The start tile and the nearby tiles each comprise a number of pixels (e.g., 16×16 pixels, 32×32 pixels, etc.).

The binary search comprises an algorithm for finding a particular tile (e.g., the start tile) along an edge of the window that intersects the graphics primitive (e.g., triangle, quadrilateral, line, etc.), by ruling out half of a range of possible start tiles along the edge at each step. For example, the binary search finds the median of the range, makes a comparison to determine whether the desired start tile comes before or after the median, and then searches the remaining half in the same manner, and so on until the start tile is located.

In this manner, embodiments of the present invention accelerate the search time for locating the edge of the graphics primitive residing inside a clipping window by a factor of 100 or more in the more difficult cases (e.g., those cases where a majority of the graphics primitive resides outside the clipping window). The accelerated search time can thus enable the binary search process to be executed in a parallel or in an overlapping manner with respect to subsequent rasterization operations, thereby greatly increasing the efficiency of real-time 3-D graphics rendering.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
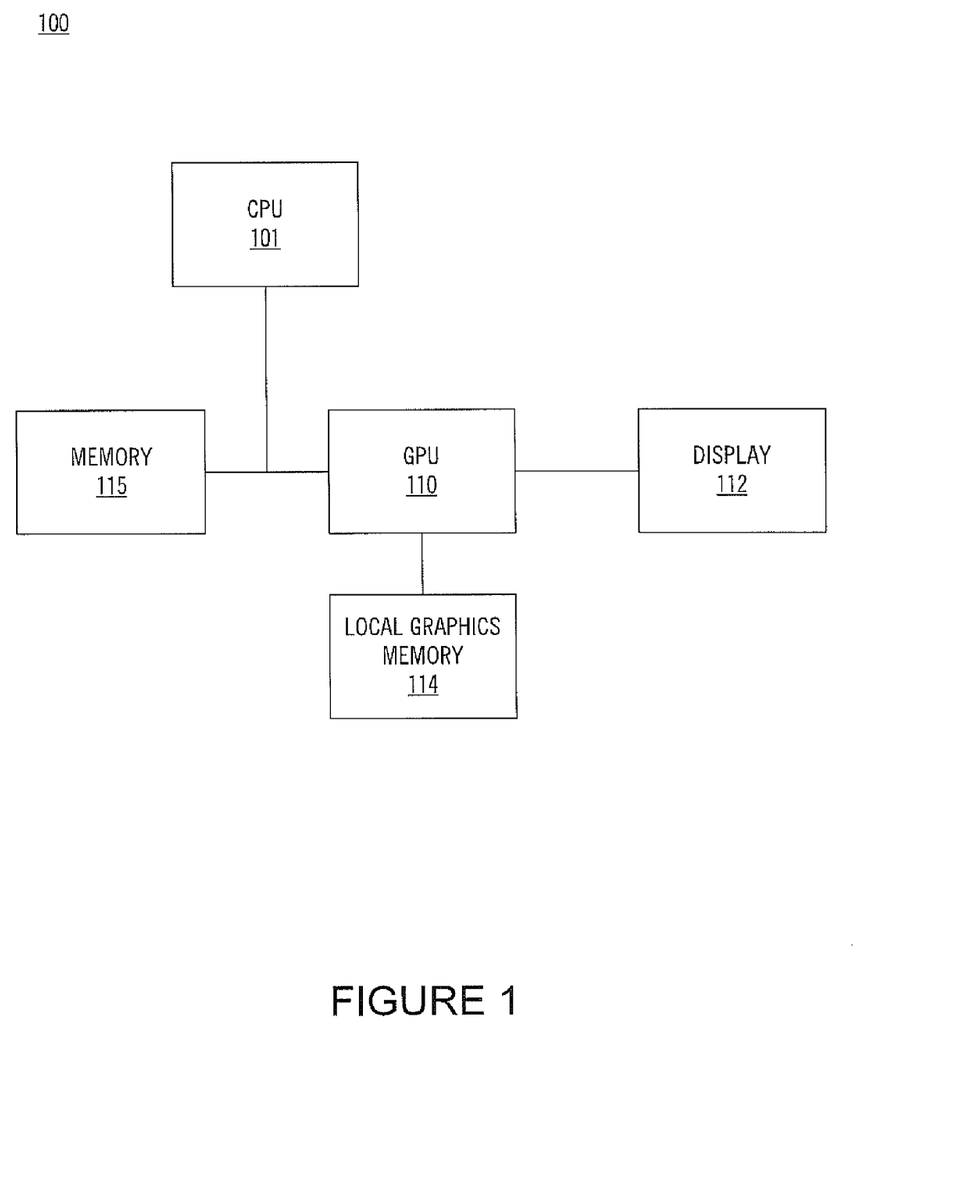
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Optionally, a local graphics memory 114 can be included for the GPU 110 for high bandwidth graphics data storage.

EMBODIMENTS OF THE INVENTION

Figure 2:
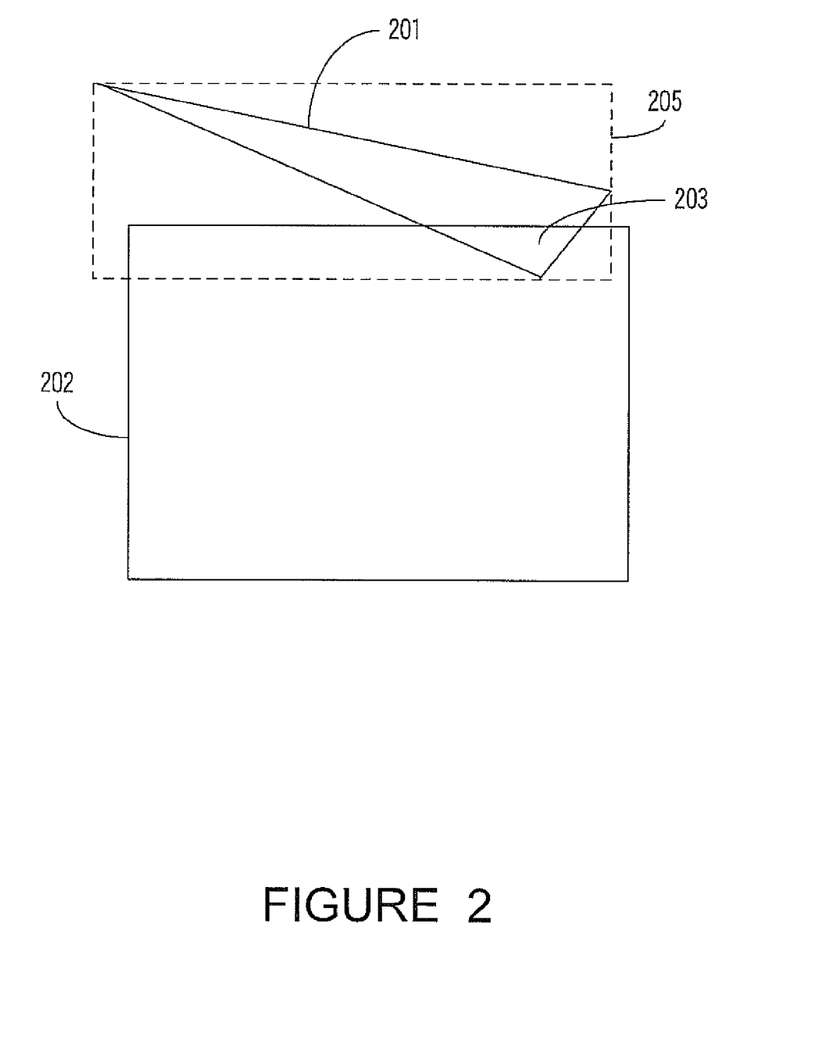
FIG. 2 shows a diagram depicting a graphics primitive and a clipping window 202 in accordance with one embodiment of the present invention.

FIG. 2 shows a diagram 200 depicting a graphics primitive 201 and a clipping window 202 in accordance with one embodiment of the present invention. As depicted in FIG. 2, the graphics primitive 201 intersects the clipping window 202, but lies mostly outside the clipping window 202.

The graphics primitive 201, in this case a triangle type graphics primitive, and the clipping window 202 illustrate a typical problematic case in rasterization for a GPU graphics pipeline. When rasterizing graphics primitives (e.g., triangles, quadrilaterals, lines, or the like), the rasterization hardware of the GPU (e.g., GPU 110) needs to decide where to begin the rasterization process within a given triangle (e.g., triangle 201). The GPU needs to determine the start point for its rasterization process.

In general, the rasterization process involves the traversal of the triangle 201 in such a manner as to visit the constituent pixels of a 2D grid of pixels comprising the image (e.g., and the grid of pixels comprising the clipping window 202) that are influenced, touched, and/or covered by the triangle 201. A number of different traversal patterns can be used by the rasterization functionality of the GPU to systematically determine which pixels are covered by the triangle 201.

The different traversal patterns generally share a common characteristic in that successive pixels that are covered by the triangle 201 are evaluated in a generally sequential fashion. For example, in one embodiment, pixels are examined in a back-and-forth, left to right or right to left, linear scanning manner (e.g., one row at a time, the one column at a time, etc.). Alternatively, in one embodiment, a boustrophedonic pattern of traversal can be used, where the term "boustrophedonic" refers to a traversal pattern which visits all pixels on a 2D area by scanning back and forth along one axis as each pass moves farther along on the orthogonal axis, much as a farmer would plow or mow a field.

A starting point for rasterizing the pixels of the triangle 201 needs to be determined regardless of the type of traversal pattern implemented by the GPU 110. In the case of a triangle (e.g., or other type of graphics primitive) residing entirely within the clipping window 202, picking the starting point is easy. Start point determination would involve, for example, using one of the vertices of the triangle as the starting point. The difficulty comes when the vertices don't lie in the clipped bounding box and the corner of the bounding box which would normally be used for the start point is outside the triangle.

In one embodiment, the GPU 110 utilizes tiles, or groups of pixels, in its traversal patterns. For example, a line of traversal would involve the GPU 110 stepping across successive tiles (e.g., 8×8 pixels, 16×16 pixels, 32×32 pixels, etc.) along the line of traversal. The first tile that intersects the triangle becomes the starting point. Alternatively, the GPU 110 can utilize tiles comprising a plurality of sample points, where each pixel includes 4, 8, 16, etc. sample points.

Embodiments of the present invention are particularly well-suited to handle more problematic cases that involve a clipped graphics primitive, such as triangle 201, that is partially clipped by the clipping window 202. For example, in a case where a triangle lies mostly outside the clipping window 202, only a small portion of the triangle may actually be inside the screen even though the bounding box for the triangle covers a much larger area of the screen. This is illustrated in FIG. 2 as small portion 203 of the triangle 201 visible in the top of the clipping window 202, while a bounding box 205 for the triangle 201 covers the majority of the top of the clipping window 202.

Embodiments of the present invention are able to rapidly find the start tile for the rasterization of the portion 203 of the triangle 201 lying within the clipping window 202. In the prior art, the rasterization process would have to start stepping across the far left edge of the triangle's bounding box to reach the left edge of the clipping window 202, and then step across the top of the window 202 and go tile by tile across the top of the screen until encountered the triangle 201. This causes an inordinate amount of wasted time as the GPU rasterizer steps across more than half of the width of the screen prior to encountering the triangle. Prior art solutions needed to check every tile, typically by walking across the top of the screen, until a tile was encountered that actually included part of the triangle. In contrast, embodiments of the present invention implement an accelerated start tile search algorithm that rapidly identifies the start tile without wasting GPU cycles or rasterization hardware.

Referring still to FIG. 2, in one embodiment, an accelerated start tile rasterization process is implemented within in a raster stage of a graphics pipeline (e.g., GPU 110). For example, in a case involving the triangle 201, upon the definition of the clipping window 202 for clipping a generated image, and upon receiving a graphics primitive 201 for rasterization in the raster stage, a binary search is implemented to rapidly identify the start tile. The binary search is related to the clipping window in that it searches the tiles comprising the clipping window (e.g., 1024×768, 1600×1200, 1920 by 1200, etc.) to determine a start tile. As described above, the start tile has at least a partial coverage of the triangle 201. Based upon the start tile, the raster stage rasterizes the triangle 201 by generating a plurality of tiles along the line of traversal. Each of these tiles at least partially cover or touch the triangle 201.

Figure 3:
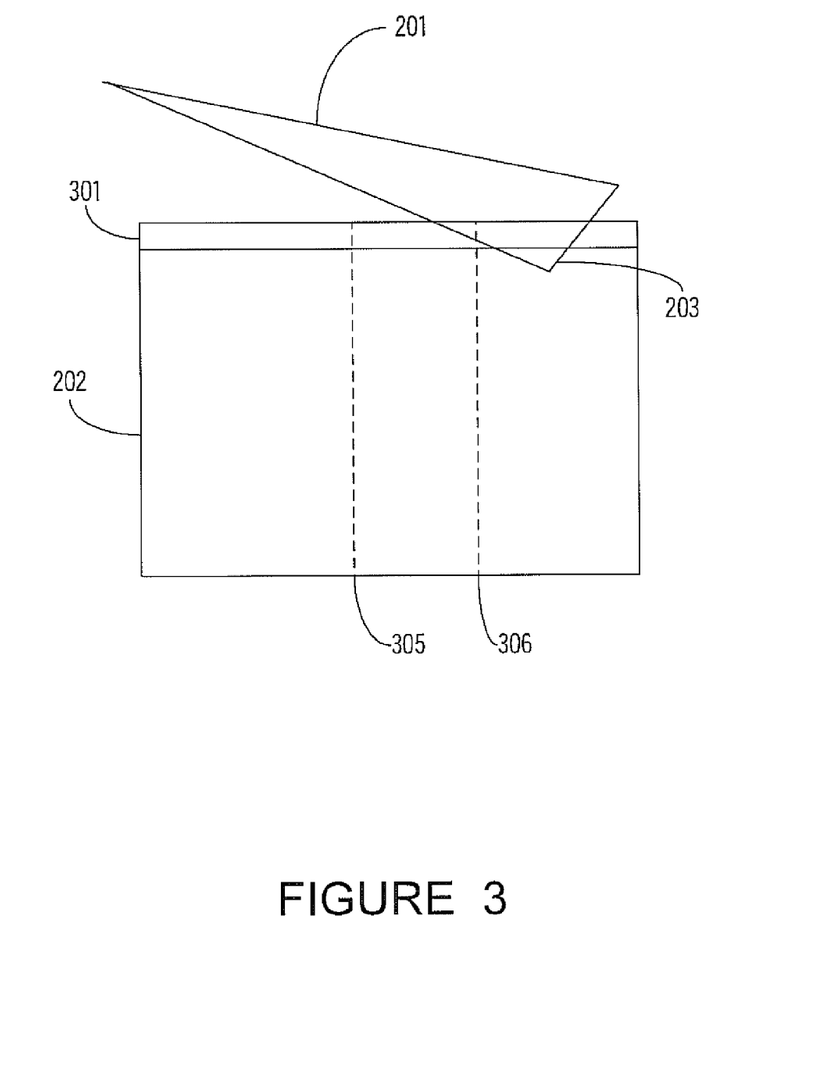
FIG. 3 shows a diagram illustrating a binary search for rasterizing the triangle 201 as performed by embodiments of the present invention.

FIG. 3 shows a diagram illustrating a binary search for rasterizing the triangle 201 as performed by embodiments of the present invention. The binary search comprises a multi-step algorithm for finding a particular tile (e.g., the start tile) along an edge of the clipping window 202 that intersects the triangle 201, by ruling out half of a range of possible start tiles along the edge at each step. For example, in the FIG. 3 embodiment, the binary search finds the median of the range of tiles comprising a line of traversal 301, makes a comparison to determine whether the desired start tile comes before or after the median, and then searches the remaining half in the same manner, and so on until the start tile is located. In each step, the remaining range is divided in half as the binary search algorithm zeroes in on the desired start tile. This is illustrated in FIG. 3 as the binary search examines the first median, shown by median line 305, determining that the desired start tile lies to the right, examining the second median, shown by line 306, determining that the start tile lies further to the right, and so on.

In this manner, the binary search along the line of traversal as implemented by embodiments of the present invention accelerate the search time for locating the edge of the graphics primitive residing inside a clipping window (e.g., the portion 203 of the triangle 201) by a factor of 100 or more in the more difficult cases (e.g., those cases where a majority of the graphics primitive resides outside the clipping window). The accelerated search time can thus enable the binary search process to be executed in a parallel or in an overlapping manner with respect to subsequent rasterization operations, thereby greatly increasing the efficiency of real-time 3-D graphics rendering. Additionally, the accelerated search time ensures needed graphics rendering hardware and clock cycles consumed by the rendering hardware are productively utilized generating pixels that are relevant to a window clipped image, as opposed to being wasted stepping across empty pixels.

It should be noted that a binary search as implemented by embodiments of the present invention is logarithmic in nature, and executes in $\log_n$ time. Specifically, $1+\log_2 N$ iterations are needed to return the desired start tile, where N corresponds to the total number of tiles along a line of traversal (e.g., such as where there are sixty 32×32 tiles along the top edge of a 1920×1200 window or image). The binary search is considerably faster than a prior art linear search, wherein in those cases where the desired start tile is distributed randomly, on average N/2 comparisons will be needed, and wherein in the worst case the start tile is the last tile tested, in which case N comparisons are needed.

Figure 4:
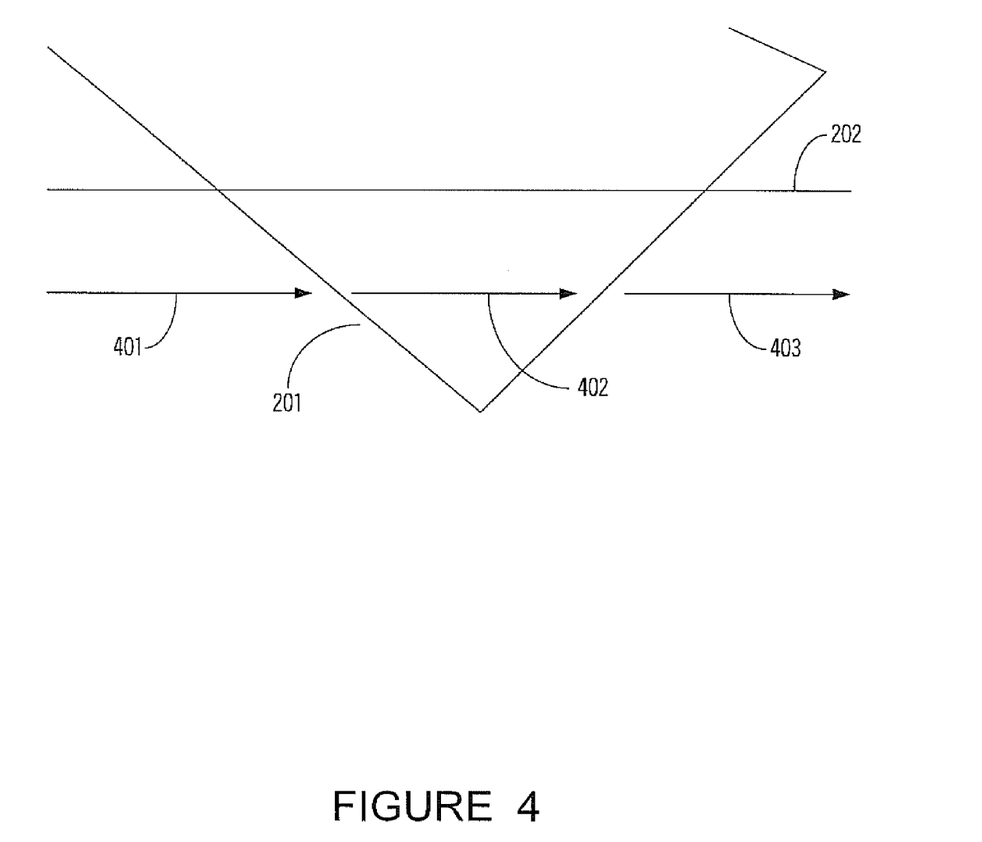
FIG. 4 shows a diagram illustrating the operation of vertex equations that are evaluated by the GPU to determine whether a particular tile or particular pixels are to the left, to the right, or within the triangle in accordance with one embodiment of the present invention.

FIG. 4 shows a diagram illustrating the operation of vertex equations that are evaluated by the GPU 110 to determine whether a particular tile or particular pixels are to the left, to the right, or within the triangle 201 in accordance with one embodiment of the present invention. In one embodiment, vertex equations based upon the vertices of the triangle 201 are used to compute the location of the edges of the triangle 201. These vertex equations indicate whether a given pixel along a line of traversal is to the left, to the right, or within a given edge of the triangle 201. Thus for example, the edge equations would indicate that the pixels (e.g., or tiles, samples, etc.) on the portion 401 of the line of traversal would be to the left of the triangle 201, the pixels on the portion 402 of the line of traversal would be within the triangle 201, and the pixels on the portion 403 of the line of traversal would be to the right of the triangle 201.

It should be noted that although the present embodiment is described in the context of performing a binary search along the top edge of the window 202, embodiments of the present invention can perform the binary search along multiple edges of the window 202. This would enable the binary search to proceed efficiently in those cases where a graphics primitive extends out of the left edge, the right edge, or the bottom of the window 202. For example, in one embodiment, a binary search can be performed on a first edge (e.g., top or bottom edge of the window 202) and then subsequently be performed on a second edge (e.g., left or right edge of the window 202) to most efficiently locate desired start tile.

Figure 5:
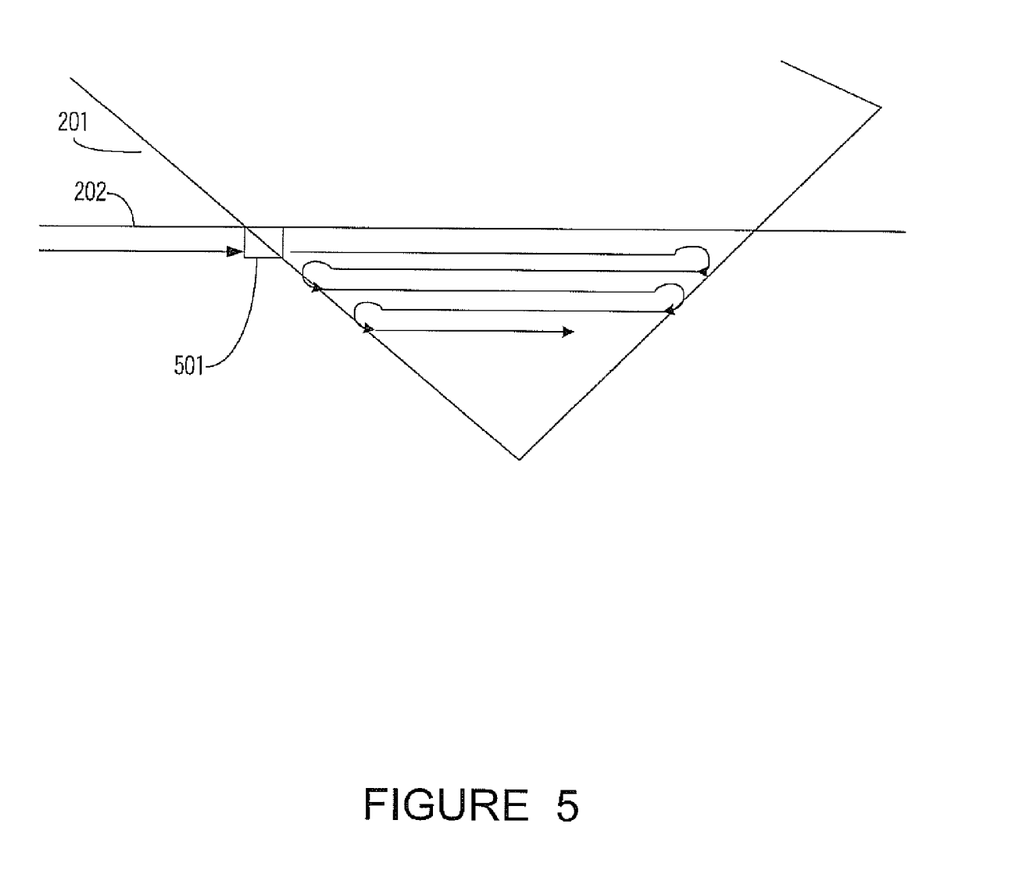
FIG. 5 shows a diagram illustrating the manner in which the start tile is located by a binary search and the manner in which successive tiles are iterated out of the triangle in accordance with one embodiment of the present invention.

FIG. 5 shows a diagram illustrating the manner in which the start tile 501 is located by a binary search and the manner in which successive adjacent tiles are iterated for the triangle 201 in accordance with one embodiment of the present invention. As described above, a binary search is used to locate the start tile 501 for the portion of the triangle 201 lying within the clipping window 202. Subsequently, based upon the start tile 501, the remainder of the triangle 201 is rasterized by generating a plurality of tiles along the line of traversal, as shown. Each of the subsequently generated tiles has at least a partial coverage of the triangle 201. It should be noted that the FIG. 5 embodiment illustrates a boustrophedonic traversal pattern.

Thus, as described above, the accelerated search time can enable the binary search process to be executed in a parallel, or in an overlapping manner, with respect to subsequent rasterization operations. For example, once the start tile 501 has been located, the binary search algorithm can proceed to locate a subsequent start tile for a subsequent graphics primitive as the remainder of the triangle 201 is rasterized. The binary search for the subsequent start tile can occur at the same time as the remaining tiles of the triangle 201 are being stamped out. This overlapping of functionality prevents graphics hardware from lying idle as one rasterization function is finished (e.g., the start tile search) while a subsequent rasterization function (e.g., the rasterization of multiple tiles out of the triangle) is ongoing.

Figure 6:
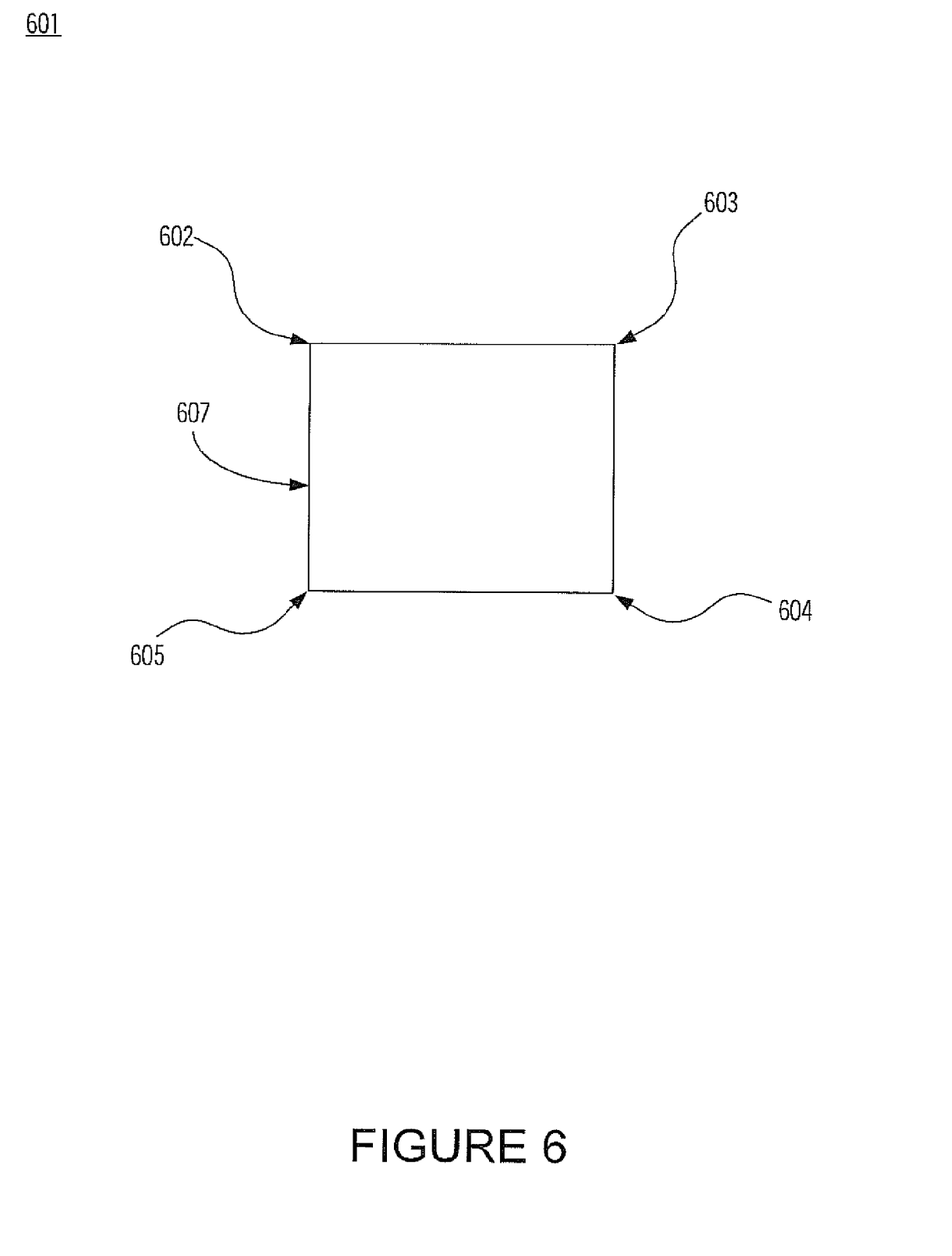
FIG. 6 shows a diagram depicting the dimensions of a tile in accordance with one embodiment of the present invention.

FIG. 6 shows a diagram depicting the dimensions of a tile 601 in accordance with one embodiment of the present invention. As depicted in FIG. 6, the tile 601 includes the corners 602-605. Depending upon the particular requirements of a given application, the tile 602 can be evaluated during the binary search at any one of the corners 602-605. In one embodiment, the tile is evaluated along a most likely edge, such as edge 607, that would first intersect a graphics primitive during the binary search process. For example, the edge of the tile 607 evaluated in accordance with the triangle edge equations described above to determine whether the next binary search median is left or right, up or down, as described above.

It should be noted that embodiments of the present invention can operate on individual pixels, or even arrays of samples within pixels, in addition to tiles of pixels, and the size of the tiles can be customized in accordance with the needs of a particular application (e.g., programmable by a graphics driver, etc.). Additionally, it should be noted that the number of edges of a given clipping window to be searched, the first and the second clipping window edge to be searched, and the edge or corner(s) of the tile to be evaluated can be programmed in accordance with the needs of a particular application (e.g., programmable by a graphics driver, etc.).

Figure 7:
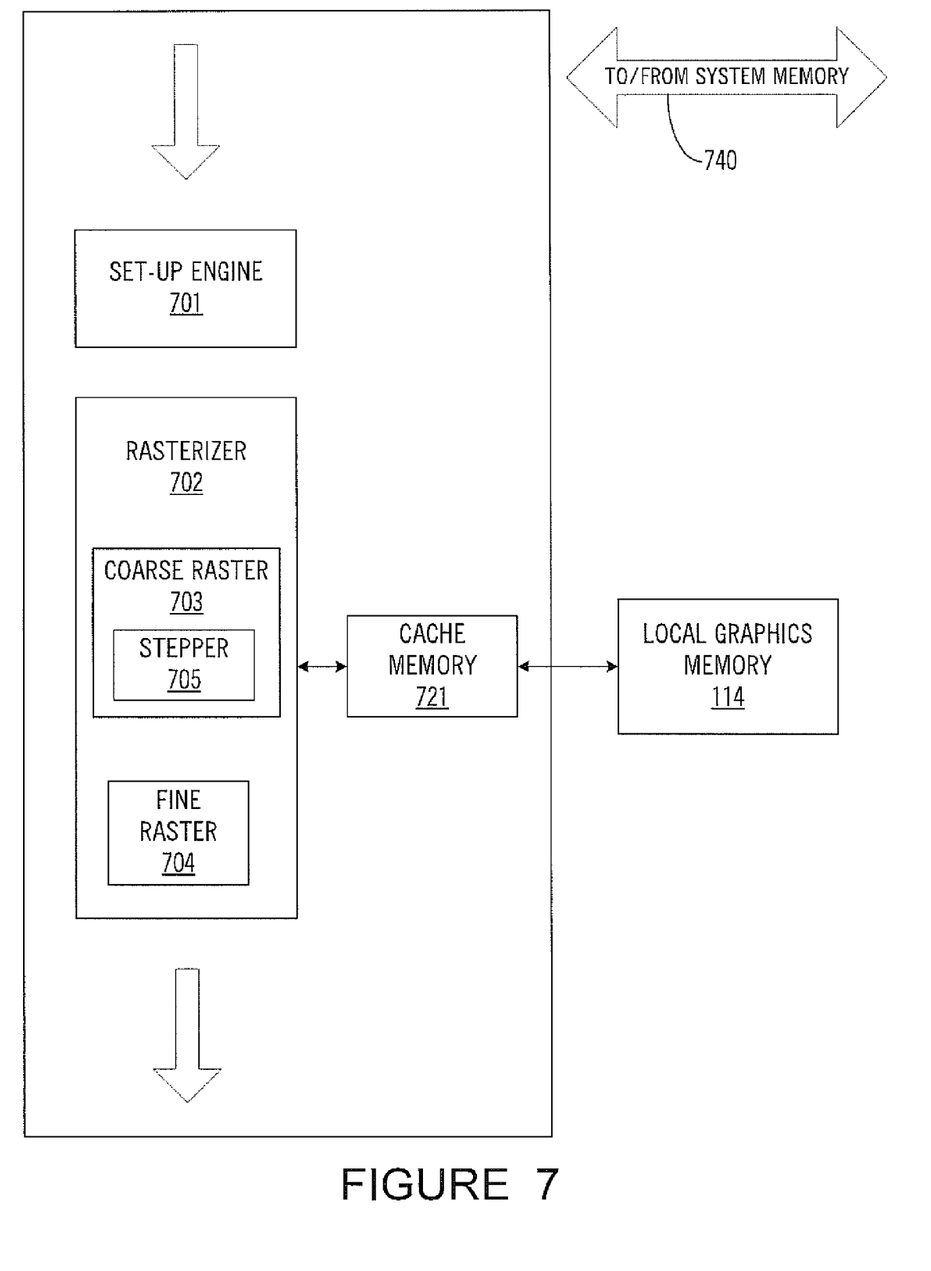
FIG. 7 shows a diagram of internal components of the GPU in accordance with one embodiment of the present invention.

FIG. 7 shows a diagram 700 of internal components of the GPU 110 in accordance with one embodiment of the present invention. As shown in FIG. 7, the GPU 110 includes a setup engine 701 and a rasterizer unit 702. In the present embodiment, the functionality of the present invention is implemented within the hardware and software of the rasterizer unit 702. Generally, the rasterizer unit 702 functions by converting descriptions based on vertices, received from the setup engine 701, to descriptions based on edge descriptions. The rasterizer unit 702 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

In one embodiment, the rasterizer unit 702 includes a fine raster component 703 and a coarse raster component 704. A stepper unit 705 is implemented within the coarse raster component 704 to implement the accelerated start tile search functionality as described above. Once the start tile has been identified, the coarse raster unit 703 rapidly searches a grid of tiles to identify tiles of interest (e.g., tiles that are covered by a primitive). Once the tiles of interest are identified, the fine raster component 703 individually identifies the pixels that are covered by the primitive. Hence, in such an embodiment, the stepper 705 identifies the desired start tile, the coarse raster component 704 rapidly searches a grid of pixels by using tiles, and the fine raster component 703 uses the information generated by the coarse raster component 704 and implements fine granularity rasterization by individually identifying pixels covered by the primitive.

Referring still to FIG. 7, the GPU 110 further includes a cache memory 721 that functions by implementing high-speed low latency storage for the most frequently used graphics rendering data. Such data typically comprises texture information, vertex information, colors, and the like. The cache memory 721 is shown coupled to the local graphics memory 112. The cache memory 721 utilizes one or more cache maintenance mechanisms to maintain coherency with the local graphics memory 112. The arrow 740 shows the communications pathway between the GPU 110 and the system memory (e.g., memory 115 shown in FIG. 1).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a raster stage of a graphics pipeline, a method for accelerated start tile rasterization, comprising:
   locating a tile to start rasterization by:
   defining a window for clipping a generated image;

receiving a graphics primitive for rasterization in a raster stage of a graphics processor;

performing a binary search on the window, wherein the binary search is performed on a first edge of the window and is subsequently performed on a second edge of the window to determine a start tile having at least a partial coverage of the graphics primitive, the start tile comprising a plurality of pixels; and based upon the start tile, rasterizing the graphics primitive by generating a plurality of adjacent tiles having at least a partial coverage of the graphics primitive.

2. The method of claim 1, wherein a portion of the graphics primitive resides outside the window.

3. The method of claim 1, wherein the binary search is performed on a first edge of the window and is subsequently performed on a remaining edge of the window.

4. The method of claim 1, wherein the first edge of the window is the top of the window.

5. The method of claim 4, wherein the second edge of the window is the left edge of the window or the right edge of the window.

6. The method of claim 1, wherein the binary search is implemented using a stepper unit within the raster stage.

7. The method of claim 6, wherein the stepper unit is configured to implement the binary search in parallel with the rasterizing of the graphics primitive.

8. The method of claim 7, wherein the binary search is implemented in parallel to overlap with a concurrent rasterization of a prior portion of the graphics primitive.

9. The method of claim 1 wherein the binary search is implemented in a coarse raster unit and a second level rasterization is implemented in a fine raster unit to determine covered pixels out of a plurality of tiles that at least partially cover the graphics primitive.

10. A GPU (graphics processor unit), comprising:

a set-up unit for generating polygon descriptions comprising a graphics primitive; and a raster unit coupled to the set-up unit for rasterizing the graphics primitive, wherein the raster unit locates a tile to start rasterization by performing a binary search related to a clipping window, wherein the binary search is performed on a first edge of the window and is subsequently performed on a second edge of the window, to determine a start tile having at least a partial coverage of the graphics primitive, the start tile comprising a plurality of pixels, and wherein the raster unit, based upon the start tile, rasterizes the graphics primitive by generating a plurality of adjacent tiles having at least a partial coverage of the graphics primitive.

11. The GPU of claim 10, wherein a portion of the graphics primitive resides outside the window.

12. The GPU of claim 10, wherein the binary search is performed on a first edge of the window and is subsequently performed on a remaining edge of the window.

13. The GPU of claim 10, further comprising:

a stepper unit within the raster stage for implementing the binary search.

14. The GPU of claim 13, wherein the stepper unit performs the binary search in parallel to overlap with a concurrent rasterization of a prior portion of the graphics primitive.

15. The GPU of claim 14 further comprising:

a coarse raster unit; and a fine raster unit, wherein the stepper unit is implemented within the coarse raster unit and the fine raster unit performs a second level rasterization to determine covered pixels out of a plurality of tiles that at least partially cover the graphics primitive.

16. A computer system, comprising:

a system memory;

a central processor unit coupled to the system memory; and a graphics processor unit communicatively coupled to the central processor unit;

a set-up unit for generating polygon descriptions comprising a graphics primitive; and a raster unit coupled to the set-up unit for rasterizing the graphics primitive, wherein the raster unit locates a tile to start rasterization by performing a binary search related to a clipping window, wherein the binary search is performed on a first edge of the window and is subsequently performed on a second edge of the window to determine a start tile having at least a partial coverage of the graphics primitive, the start tile comprising a plurality of pixels, and wherein the raster unit, based upon the start tile, rasterizes the graphics primitive by generating a plurality of adjacent tiles having at least a partial coverage of the graphics primitive.

17. The computer system of claim 16, wherein a portion of the graphics primitive resides outside the window.

18. The computer system of claim 17, wherein the binary search is performed on a first edge of the window and is subsequently performed on another of a plurality of edges of the window.

19. The computer system of claim 18, further comprising:

a stepper unit within the raster stage for implementing the binary search, and wherein the binary search is performed in parallel to overlap with a concurrent rasterization of a prior portion of the graphics primitive.

20. The computer system of claim 19 further comprising:

a coarse raster unit; and a fine raster unit, wherein the stepper unit is implemented within the coarse raster unit and the fine raster unit performs a second level rasterization to determine covered pixels out of a plurality of tiles that at least partially cover the graphics primitive.

\* \* \* \* \*